US010823614B2

(12) United States Patent
Coffin (10) Patent No.: US 10,823,614 B2
(45) Date of Patent: Nov. 3, 2020

(54) DEVICE FOR PROVIDING VARIABLE SIZED APERTURE FOR A SAMPLE (71) Applicant: Thermo Electron Scientific Instruments LLC, Madison, WI (US)

(72) Inventor: John Magie Coffin, Blue Mounds, WI (US)

(73) Assignee: Thermo Electron Scientific Instruments LLC, Madison, WI (US)

(*) Notice: Subject to any disclaimer, the term of this patent is extended or adjusted under 35 U.S.C. 154(b) by 0 days.

(21) Appl. No.: 16/034,928

(22) Filed: Jul. 13, 2018

(65) Prior Publication Data
US 2019/0017870 A1  Jan. 17, 2019

Related U.S. Application Data (60) Provisional application No. 62/532,522, filed on Jul. 14, 2017.

(51) Int. Cl.
*G01J 3/02* (2006.01)
*G01J 3/453* (2006.01)
*G02B 5/00* (2006.01)
*G01J 3/45* (2006.01)
*G02B 27/30* (2006.01)
*H04N 5/33* (2006.01)

(52) U.S. Cl.
CPC .......... *G01J 3/0229* (2013.01); *G01J 3/0216* (2013.01); *G01J 3/0235* (2013.01); *G01J 3/0289* (2013.01); *G01J 3/45* (2013.01); *G01J 3/4535* (2013.01); *G02B 5/005* (2013.01); *G02B 27/30* (2013.01); *H04N 5/33* (2013.01); *G01J 2003/4534* (2013.01)

(58) Field of Classification Search
CPC .................................................. G01J 3/0229
See application file for complete search history.

(56) References Cited

U.S. PATENT DOCUMENTS 3,671,754 A * 6/1972 Mundkur ........... G01N 21/5911
                                              250/236
5,165,078 A * 11/1992 Hough .................. G01J 3/32
                                              250/232
6,031,609 A * 2/2000 Funk ................... G01J 3/4531
                                              356/308

(Continued)

FOREIGN PATENT DOCUMENTS

WO    WO2011056012 A2    5/2011

OTHER PUBLICATIONS

PCT/US2018/042037; International Preliminary Report on Patentability; dated Jan. 23, 2020; 8 pp.

*Primary Examiner* — Shawn Decenzo
(74) *Attorney, Agent, or Firm* — William R. McCarthy, III (57) ABSTRACT An apparatus for providing a variable sized aperture for an imaging device includes a first plate having a first plurality of plate apertures extending therethrough and a second plate having a second plurality of plate apertures extending therethrough. A first motor is operably connected to the first plate and a second motor is operably connected to the second plate. The first and second motors are configured to move the first plate and the second plate with respect to one another so as to align any of the first plurality of plate apertures with any of the second plurality of plate apertures to define a plurality of light beam apertures.

15 Claims, 6 Drawing Sheets (56) References Cited

U.S. PATENT DOCUMENTS

| | | | |
|---|---|---|---|
| 7,456,950 B2* | 11/2008 | Deck | G01J 3/02 250/339.07 |
| 2007/0171409 A1 | 7/2007 | Wang | |
| 2008/0175280 A1* | 7/2008 | Bouma | G01J 3/02 372/20 |
| 2009/0021819 A1* | 1/2009 | Amos | G01J 3/14 359/234 |
| 2013/0021613 A1* | 1/2013 | Furxhi | G02B 26/10 356/445 |
| 2014/0168740 A1 | 6/2014 | Brunner | |
| 2019/0186992 A1* | 6/2019 | Munch | G01J 3/14 |

* cited by examiner

DEVICE FOR PROVIDING VARIABLE SIZED APERTURE FOR A SAMPLE

CROSS-REFERENCE TO RELATED APPLICATION

This application claims the benefit of U.S. provisional patent application No. 62/532,522, filed Jul. 14, 2017. The content of this application is incorporated by reference in its entirety.

FIELD OF THE INVENTION

Aspects of this invention relates generally to a device that provides a variable sized aperture for analyzing a sample with infrared spectroscopy.

BACKGROUND OF THE INVENTION

Fourier transform infrared (FTIR) spectrometry was developed to overcome limitations of dispersive spectrometry techniques, particularly the slow scanning process. With FTIR, all infrared (IR) frequencies can be measured simultaneously, rather than individually, with a simple optical device referred to as an interferometer. An interferometer produces a unique signal containing all IR frequencies "encoded" within it. This signal can be measured very quickly, e.g., within approximately one second, thereby reducing the time element per sample to a matter of only a few seconds rather than several minutes.

Most interferometers employ a beamsplitter which receives an incoming IR beam and divides it into two optical beams. One beam is reflected by a flat mirror which is fixed in place. The other beam is reflected by a movable flat mirror which is controlled to move back and forth over a short distance (e.g., a few millimeters). The resulting two reflected beams are recombined when they meet back at the beamsplitter.

When only a portion of a sample is to be analyzed, an aperture may be used to control the size and shape of the infrared beam. A variable aperture can be used so as to be able to vary the aperture size and shape to correspond to the size and shape of the sample area to be observed. Some devices use a variable aperture device that includes four jaws controlled by motors and gears that work together to provide an aperture of varying size and shape.

It would be desirable to provide a device that provides a variable sized aperture that reduces or overcomes some or all of the difficulties inherent in prior known processes. Particular objects and advantages will be apparent to those skilled in the art, that is, those who are knowledgeable or experienced in this field of technology, in view of the following disclosure of the invention and detailed description of certain embodiments.

SUMMARY

In accordance with a first aspect, an apparatus for providing a variable sized aperture for an imaging device includes a first plate having a first plurality of plate apertures extending therethrough and a second plate having a second plurality of plate apertures extending therethrough. A first motor is operably connected to the first plate and a second motor is operably connected to the second plate. The first and second motors are configured to move the first plate and the second plate with respect to one another so as to align any of the first plurality of plate apertures with any of the second plurality of plate apertures to define a plurality of light beam apertures.

In accordance with another aspect, an imaging device includes an IR source, a collimator positioned downstream of the IR source, an interferometer positioned downstream of the collimator, and a sample compartment positioned downstream of the interferometer. A detector is positioned downstream of the sample compartment and an aperture controlling assembly positioned between the sample compartment and the detector. The aperture controlling assembly includes a first plate having a first plurality of plate apertures extending therethrough, and a second plate having a second plurality of plate apertures extending therethrough. A first motor is operably connected to the first plate and a second motor is operably connected to the second plate. The first and second motors are configured to move the first plate and the second plate with respect to one another so as to align any one of the first plurality of plate apertures with any one of the second plurality of plate apertures to define a plurality of light beam apertures.

In accordance with other aspects, the imaging device may include a controller connected to the first and second motors and the detector. The imaging device may also include a beam splitter and a monitor to allow a user to view an area of the sample to be analyzed.

These and additional features and advantages disclosed here will be further understood from the following detailed disclosure of certain embodiments.

The figures referred to above are not drawn necessarily to scale, should be understood to provide a representation of particular embodiments of the invention, and are merely conceptual in nature and illustrative of the principles involved. Some features of the imaging device depicted in the drawings have been enlarged or distorted relative to others to facilitate explanation and understanding. The same reference numbers are used in the drawings for similar or identical components and features shown in various alternative embodiments. Imaging devices as disclosed herein would have configurations and components determined, in part, by the intended application and environment in which they are used.

DETAILED DESCRIPTION OF EMBODIMENTS

Figure 1:
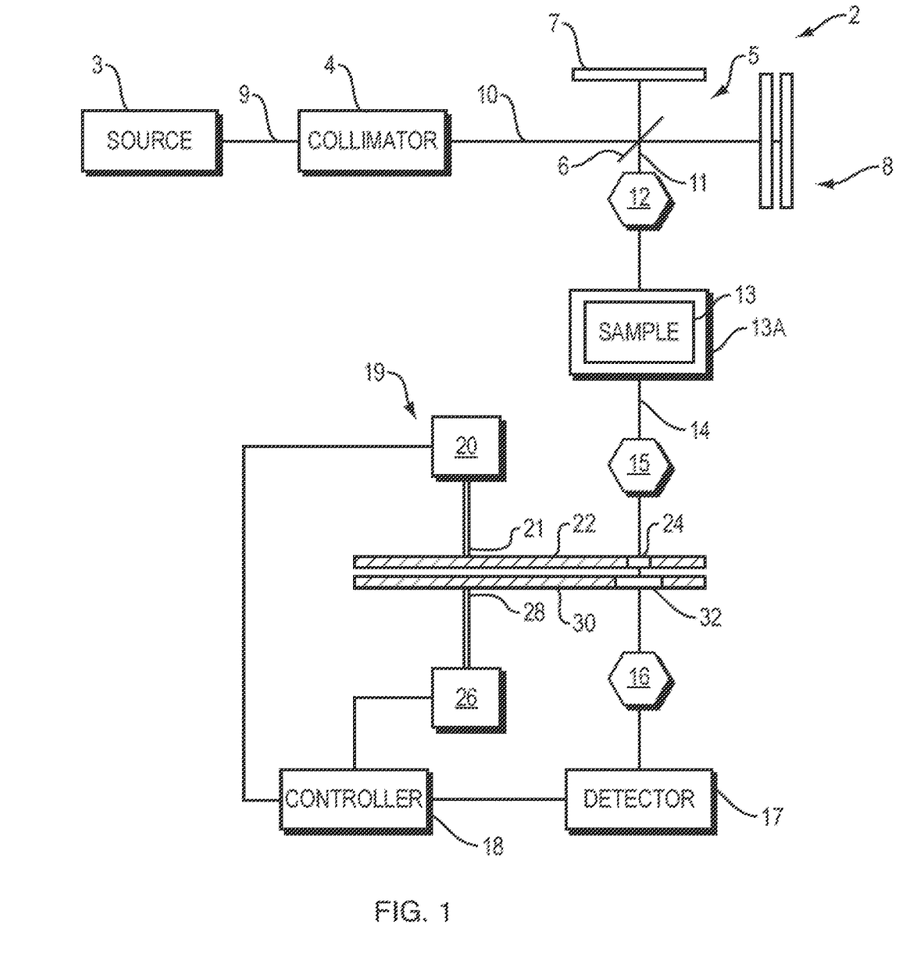
FIG. 1 is a schematic view of an FTIR spectrometer device using first and second plates that form a variable sized aperture.

FIG. 1 illustrates as a representative imaging device a common FTIR spectrometer 2 that includes an IR source 3, a collimator 4 and an interferometer 5 (e.g., a Michelson interferometer). The interferometer 5 includes a beamsplitter 6, a fixed mirror 7 and a movable mirror 8. The source 3 generates IR radiation 9 which the collimator 4 aligns to produce parallel rays of light 10. The collimated IR signal 10 is encoded with an interferogram 11 by interferometer 5, passes through a first focus element 12, and then irradiates a sample 13 typically housed in a sample compartment 13A.

The resulting IR signal 14 containing energy not absorbed by the sample is passed through a second focus element 15 and a third focus element 16 and then is detected by a detector 17. The focus elements may be magnifying lenses or mirrors when longer infrared wavelengths of light are used.

The IR signal is then amplified and converted to a digital signal by an amplifier and analog-to-digital converter (ADC), respectively (not shown), for processing by a controller 18, in which a Fourier transform is computed. Though not shown here, also included is a laser source that provides a reference signal. As is known in the art, the zero amplitude crossings of this reference signal define the discrete time intervals during which the interferogram is sampled.

Typically only a portion of sample 13 is to be analyzed. In order to obtain a measurement of only a portion of the sample, it is desirable to limit the light reaching detector 17. This eliminates light from other areas of the sample so that the light contains pure spectral information, which improves analysis of the sample.

In order to measure a portion of sample 13, an aperture controlling assembly 19 is positioned between second focus element 15 and third focus element 16, and may include a first motor 20 connected to a first plate 22 that includes a plurality of first plate apertures 24 (only one aperture 24 is visible in FIG. 1). First motor 20 may be connected to first plate 22 by a first shaft 21. A second motor 26 may be connected by way of a second shaft 28 to a second plate 30 that includes a plurality of second plate apertures 32 (only one aperture 32 is visible in FIG. 1). First motor 20 and second motor 26 may be stepper motors or any other motor suitable to rotate first plate 22 and second plate 30, respectively.

As described in greater detail below, first motor 20 and second motor 26 are activated by controller 18 to rotate first plate 22 and second plate 30, respectively to align selected plate apertures of first plate 22 and second plate 30 to define a light beam aperture 38, so that the beam that passes to detector 17 matches the size and shape of sample 13 to be analyzed.

Figure 2:
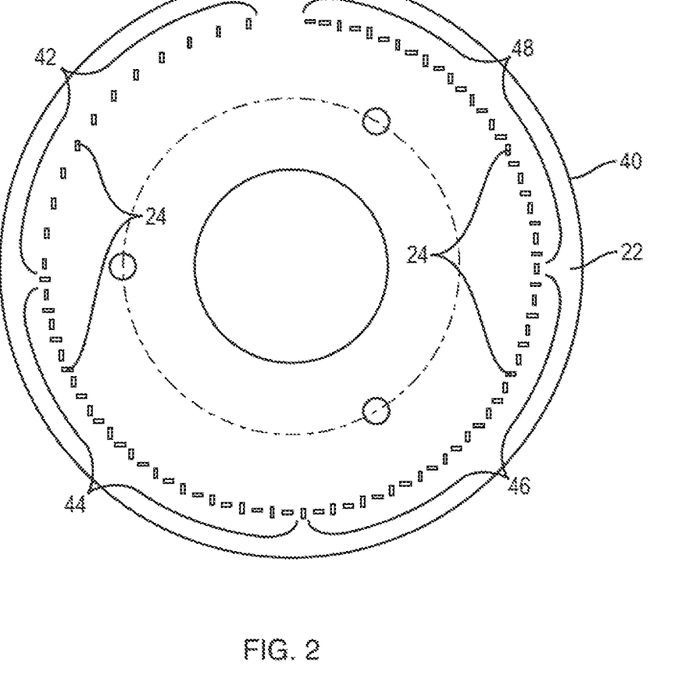
FIG. 2 is a plan view of an embodiment of the first plate of the device of FIG. 1.
Figure 3:
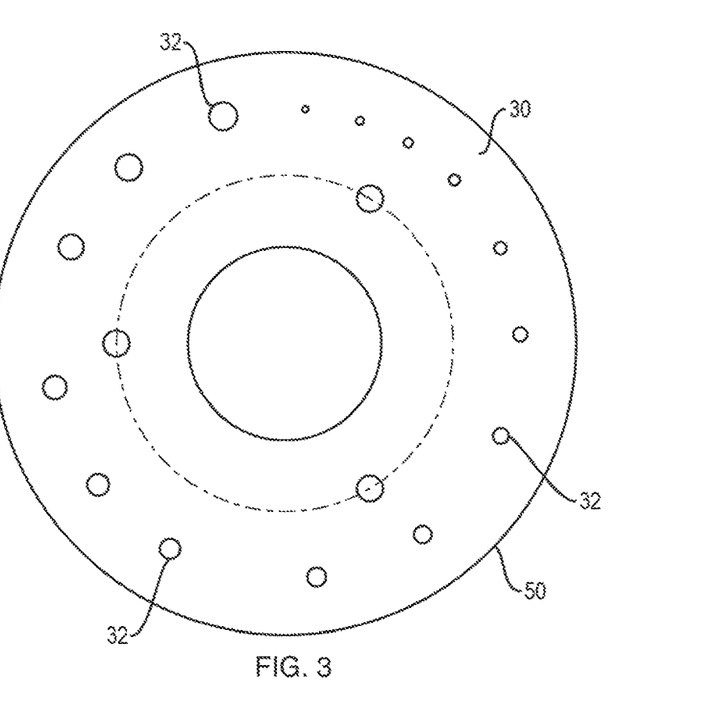
FIG. 3 is a plan view of an embodiment of the second plate of the device of FIG. 1.

As seen in FIGS. 2 and 3, first plate 22 may include a first plurality of plate apertures 24 and second plate 30 may include a second plurality of plate apertures 32. In the illustrated embodiment, plate apertures 24 are rectangular apertures and plate apertures 32 are circular apertures.

As illustrated here, each of first plate 22 and second plate 30 is a circular disk. It is to be appreciated that first plate 22 and second plate 32 can have a shape other than circular. In certain embodiments, first plate 22 and second plate 30 are each formed of a thin plate of metal. Plate apertures 24 may be photo etched or laser cut into first plate 22, for example. It is to be appreciated that first plate 22 and second plate 30 may be formed of any desired material.

A common sample to be examined is a thin film, where the thickness of the sample is small enough that a simple round aperture will work. However, small round apertures may provide a low amount of collected light, resulting in a weak and noisy spectra that must be collected over a long period of time to reduce the noise level to an acceptable level. By using a rectangular aperture, 2 to 10 times more light can be passed through, greatly speeding up the collection of data. As discussed below, first plate 22 and second plate 30 may include a combination of circular and rectangular apertures.

Figure 4:
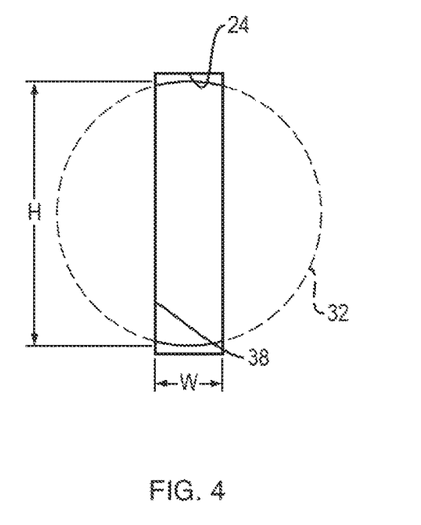
FIG. 4 is a schematic plan view of a plate aperture of the first plate of the device of FIG. 1 overlapped with a plate aperture of the second plate and defining a light beam aperture.

When first plate 22 and second plate 30 are overlapped such that a beam of light can pass through a first pair of plate apertures 24, 32, as illustrated FIG. 1 and FIG. 4, the first pair of plate apertures forms a light beam aperture 38 having a width W defined by plate aperture 24 of first plate 22 and a height H defined by plate aperture 32 of second plate 30. Thus the beam of light that passes through this pair of plate apertures takes on a shape defined by the plate aperture 24 of first plate 22 and the plate aperture 32 of second plate 32. As seen here light beam aperture 38 is nearly rectangular in shape, with its sides extending substantially straight and its ends being slightly curved. In certain embodiments, light beam aperture 38 may have an aspect ratio of approximately 5:1 such that height H is approximately 5 times width W.

As used herein, the phrase "substantially" is intended to modify the term is it used with to mean mostly, or almost completely. For example, the phrase "substantially straight" is intended to mean straight, or almost completely straight, within the constraints of sensible, commercial engineering objectives, manufacturing tolerances, costs, and capabilities in the field of imaging systems.

First plate 22 and second plate 30 may be positioned closely to one another such that they essentially are at the same optical focus. In certain embodiments, the distance between first plate 22 and second plate 30 may be between approximately 0.01" and approximately 0.1". In certain embodiments, first plate 22 and second plate 30 may even be in contact with one another.

In the embodiment illustrated in FIG. 2, plate apertures 24 are positioned along a circle proximate a peripheral edge 40 of first plate 22. It is to be appreciated that plate apertures 24 are shown here with rectangular shapes as an exemplary shape for use with imaging device 10. It is to be appreciated that plate apertures 24 can have different shapes other than rectangular. Further, it is to be appreciated that the number and sizes of plate apertures 24 formed in first plate 22 can vary as well. In the example illustrated in FIG. 2, plate 22 includes four groups of substantially rectangularly shaped apertures (e.g. subsets 42, 44, 46, and 48) that all have apertures of about the same length but each group having a different width from the other groups. In the present example, each group comprises 24 apertures although this should not be considered as limiting because of choice or due to the fact that embodiments of plate 22 may be larger or smaller which may increase or reduce the area available and thus may affect aperture number in each group. Similarly, plate 22 may include more or fewer groups for the same reasons.

More specifically as illustrated in the example of FIG. 2, a first subset 42 of the plurality of plate apertures 24 is positioned in one quadrant of first plate 22. Each of the plate apertures 24 in first subset 42 may have the same size as the other plate apertures in first subset 42 and may extend substantially parallel to one another. It is to be appreciated that additional apertures may be provided between the apertures seen in first subset 42, but are not shown here for purposes of clarity. As FIG. 2 illustrates, first subset 42 has half of the apertures removed to make it easier to understand with subset 42 having a plurality of rectangular apertures 24 that are substantially parallel to each other but each have a slightly different angular relationship relative to the circumference of first plate 22. Therefore, if first plate 22 is rotated by some amount such as, for instance, 7.5 degrees, apertures 24 all rotate relative to a fixed location such as the field of view associated with the microscope optics. Thus, the angular relationship of the rectangular shape of a second embodiment of aperture 24 in the field of view includes a 7.5 degree rotational difference relative to the previous first embodiment of aperture 24 in the field of view. In other words, because the plate apertures 24 in first subset 42 are offset from one another along the circle on which they are positioned, each aperture 42 lines up with a corresponding aperture 30 in a different orientation than the other plate apertures 24 in subset 42 as the plates are rotated. This provides control of the angle of the rectangle of aperture 24 in the field of view that enables matching the shape of aperture 24 to the angle of a given sample to within plus or minus 3.25 degrees in a very cost effective way.

Additional apertures are seen in other quadrants of first plate 22 as discussed below. For example, the sizes of apertures 24 in subsets 44, 46, and 48 are shown with an additional set of apertures 24 that are substantially parallel to one another and positioned at a 90 degree rotation relative to the first set of substantially parallel apertures 24 which are in substantially the same positional relationship to first plate 24 as apertures 24 in first subset 42. This allows a near doubling of the number of apertures 24 in subsets 44, 46, and 48 in the same space which also provides for more positional choices of apertures 24 in the field of view.

As noted above, the light beam aperture 38 is optimally aligned with the portion of the sample to be analyzed. If the rectangular shaped light beam aperture is not rotated to match the angle/orientation of the sample, light from unwanted nearby layers of the sample thin film will be collected, causing errors in the measured spectra. Therefore first plate 22 is provided with a variety of rectangular apertures that are selectable in small steps of rotation (about 7 degrees) to allow close matching of the orientation of the sample to the orientation of the light beam aperture 38.

Figure 5:
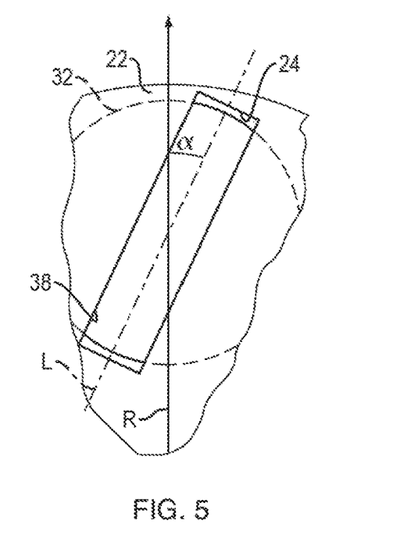
FIG. 5 is a schematic plan view, shown partially cut away, of another aperture of the first plate of the device of FIG. 1 overlapped with an aperture of the second plate.
Figure 6:
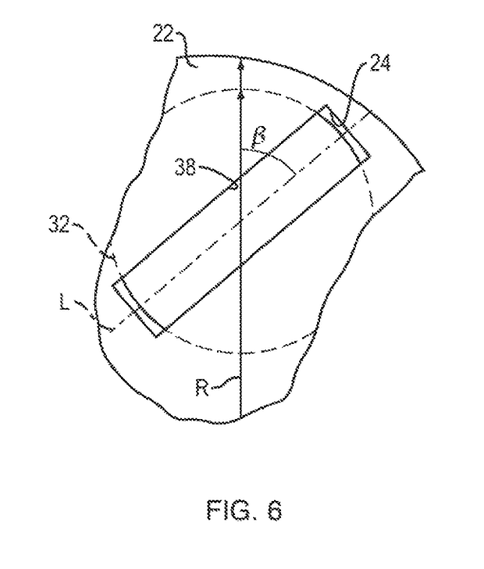
FIG. 6 is a schematic plan view, shown partially cut away, of yet another aperture of the first plate of the device of FIG. 1 overlapped with an aperture of the second plate.

The different angled orientations of the apertures can be seen by comparing the light beam aperture 38 formed by plate apertures 24, 32 seen in FIG. 5 with the light beam aperture 38 formed by plate apertures 24, 32 seen in FIG. 6. A longitudinal axis L of light beam aperture 38 in FIG. 5 has an angle α with respect to a radius R of first plate 22 and second plate 30. A longitudinal axis L of light beam aperture 38 in FIG. 6 has an angle β with respect to radius R, with angle β being larger than angle α. Thus, it can be seen that the longitudinal axis L of each of the apertures 38 formed when plate apertures 24 in first subset 42 are overlapped with a particular aperture 32 of second plate 30 will have a different angle with respect to the radius R of the plates than each of the other apertures 38 so formed.

As seen in the embodiment illustrated in FIG. 2, a second subset 44 has a plurality of plate apertures 24 positioned in a second quadrant of first plate 22. Each of the plate apertures 24 in second subset 44 has the same size as the other plate apertures in second subset 44, with that size being smaller than the size of the plate apertures of first subset 42.

In second subset 44, plate apertures 24 are positioned alternately substantially parallel and substantially rectangular to one another along the circle on which they are positioned. This provides for additional different orientations than those seen in first subset 42, where plate apertures 24 are only disposed substantially parallel to one another and the perpendicularly oriented apertures 24 have been removed for clarity.

A third subset 46 has a plurality of plate apertures 24 positioned in a third quadrant of first plate 22. Each of the plate apertures 24 in third subset 46 has the same size as the other plate apertures in third subset 46, which is smaller than the plate apertures of first subset 42 and second subset 44.

In a similar manner as that seen in second subset 44, third subset 46 has plate apertures 24 that are positioned alternately substantially parallel and substantially rectangular to one another along the circle on which they are positioned.

A fourth subset 48 has a plurality of plate apertures 24 positioned in a fourth quadrant of first plate 22. Each of the plate apertures 24 in fourth subset 48 has the same size as the other plate apertures in fourth subset 48, which is smaller than the plate apertures of first subset 42, second subset 44, and third subset 46.

In a similar manner as that seen in second subset 44 and third subset 46, fourth subset 48 has plate apertures 24 that are positioned alternately substantially parallel and substantially rectangular to one another along the circle on which they are positioned.

As seen in FIG. 3, second plate apertures 32 of second plate 30 are all circular and are positioned along a circle positioned proximate a peripheral edge 50 of second plate 30. Each second aperture 32 has a diameter different than each of the other second plate apertures 32. In the example of FIG. 3, second plate 30 comprises 15 embodiments of aperture 32, however it will be appreciated that second plate 30 may comprises different numbers of aperture 32 such as about 24. Further, in the present example the diameters of apertures 32 may be smaller than the largest dimension of rectangular aperture 24 in first plate 22, although one or more or of apertures 32 may be of substantially the same or larger dimension. Passing light through both plates 22 and 30 allows the diameter of the round holes to define 24 different lengths of the rectangular apertures 24. Therefore any of apertures 24 can have about 24 different lengths with slightly rounded end as defined by the diameter of one of apertures 32 in plate 30.

It should be noted that by the addition of one at least large aperture 32 with apertures 24 it is possible to have a set of substantially round shapes (e.g. 24 possibilities) of the light passing through plates 22 and 30 to choose from for samples that are substantially round. For example, the combination of 24 hole sizes and 4 different rectangle widths give 24×4=96 rectangle sizes to choose from and that each of the 96 rectangles can be rotated to 24 different angles give 96×24=2304 different rectangular aperture+24 round apertures for a total of 2328 different apertures to allow a good match to a very wide range sample sizes and shapes.

As noted above, first plate apertures 24 and second plate apertures 32 are positioned along circles proximate the peripheral edges 40, 50 of first plate 22 and second plate 30, respectively, such that they can align with one another as the plates are rotated by first and second motors 20, 26. When a sample 13 to be studied is in position in imaging device 10, first and second motors 20, 26 are activated to rotate first plate 22 and/or second plate 30 such that an aperture 24 of first plate 22 is overlapped with one of the plate apertures 32 of second plate 30, thus defining a light beam aperture 38 that is sized to match the size of the sample to be studied.

By allowing each of first plate 22 and second plate 30 to be rotated, and by providing each of first plate 22 and second plate 30 with a variety of plate apertures of different shapes and sizes, a large number of apertures 38 can be defined, with each light beam aperture 38 being formed to have a different size and orientation than each of the other apertures 38 so formed. This provides for a large number of aperture sizes and shapes that can be used to match a light beam size and shape to the size and shape of the portion of the sample to be studied with imaging device 10.

It is to be appreciated that the number of plate apertures provided in each of first plate 22 and second plate 30 can be varied. When more plate apertures are provided in a plate, the difference in the angle of orientation of the slots can be smaller. As fewer plate apertures are provided about the plate, the difference in the angle of orientation of the slots will increase.

Figure 7:
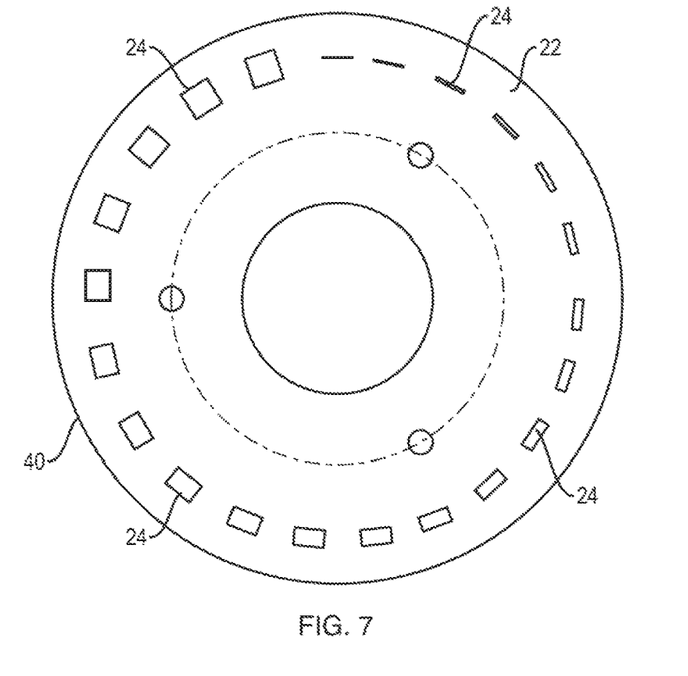
FIG. 7 is a plan view of an alternative embodiment of the first plate of the device of FIG. 1.
Figure 8:
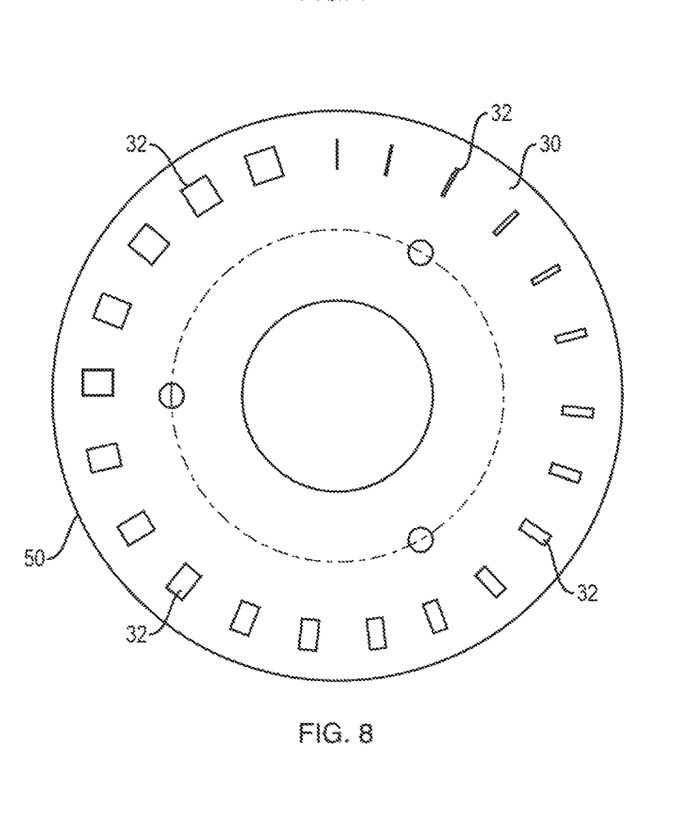
FIG. 8 is a plan view of an alternative embodiment of the second plate of the device of FIG. 1.
Figure 9:
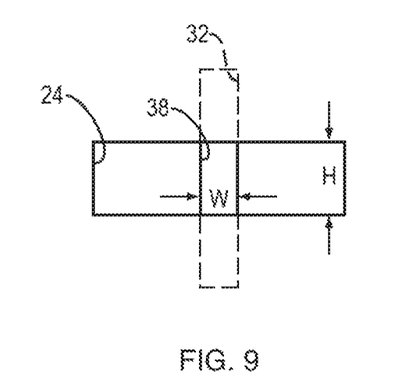
FIG. 9 is a schematic plan view of an aperture of the first plate of FIG. 7 overlapped with an aperture of the second plate of FIG. 8.

Another embodiment is illustrated in FIGS. 7-8. In this embodiment, first plate apertures 24 of first plate 22 are all rectangular in shape, and are positioned along a circle positioned proximate peripheral edge 40 of first plate 22. Each of first plate apertures 24 has a different size than the other first plate apertures 24. In this embodiment, second plate apertures 32 of second plate 30 are also all rectangular in shape, and are positioned along a circle proximate peripheral edge 50 of second plate 30. As seen in FIG. 9, when a first aperture 24 and a second aperture 32 of this embodiment overlap, the light beam aperture 38 so defined is also rectangular in shape and height H defined by aperture 24 of first plate 22 and a width W defined by an aperture 32 of second plate 30. The number of rectangular sizes and widths possible in this embodiment are large, offering good size control over a wide range of sample sizes. However, the rotation of the rectangular light beam aperture 38 is fixed. It is to be appreciated that it is possible to add a third motor and a mechanical bearing and support system to rotate the entire aperture controlling assembly 19 around the selected light beam aperture 38 in order to align light beam aperture 38 with the sample. Also in embodiments where the rectangle shape aperture can be rotated by the third motor then only one aperture per size may be needed which provides some space savings.

Figure 10:
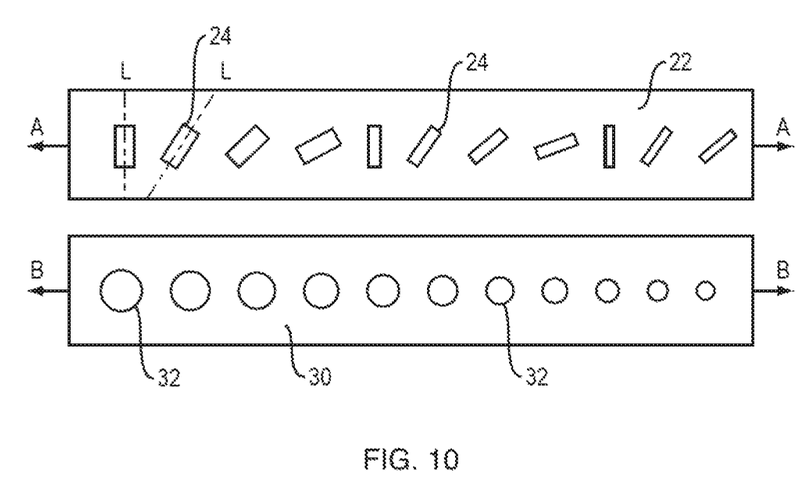
FIG. 10 is a plan view of alternative embodiments of first and second plates for use with the device of FIG. 1.

As noted above, first plate 22 and second plate 30 may have shapes other than the circular shapes discussed and illustrated above. For example, as seen in FIG. 10, first plate 22 and second plate 30 may be rectangular in shape. As illustrated here, first plate apertures 24 of first plate 22 are rectangular in shape and may vary in size and orientation. For example, there are different sized first plate apertures 24. As seen here, second plate apertures 32 may be circular in shape and may similarly vary in dimension. Other shapes for first plate apertures 24 and second plate apertures 32 are also considered to be within the scope of this embodiment.

In such an embodiment, first motor 20 and second motor 26 would be configured to move first plate 22 laterally back and forth in a direction A and second plate 30 laterally back in forth in a direction B that, for example may extend substantially parallel to direction A. However, direction B may be at any angle relative to direction A that is desired and is not limited to a parallel direction.

Similar to the embodiments illustrated in FIGS. 5 and 6, in the embodiment of FIG. 10 each first aperture 24 may have a longitudinal axis L that is oriented at a different angle than the longitudinal axis L of the other first plate apertures 24 of first plate 22. This provides for apertures 38 of different orientations when first plate 22 and second plate 30 are overlapped and first plate apertures 24 are aligned with a corresponding second aperture 32.

Overall, aspects of the invention are directed to sample isolation devices, analytical instruments, and methods for sample analysis, which may be associated with greatly simplified sample preparation steps, compared to conventional steps. Those having skill in the art, with the knowledge gained from the present disclosure, will recognize that various changes can be made to the disclosed apparatuses and methods in attaining these and other advantages, without departing from the scope of the present invention. As such, it should be understood that the features described herein are susceptible to modification, alteration, changes, or substitution. The specific embodiments illustrated and described herein are for illustrative purposes only, and not limiting of the invention as set forth in the appended claims.

Figure 11:
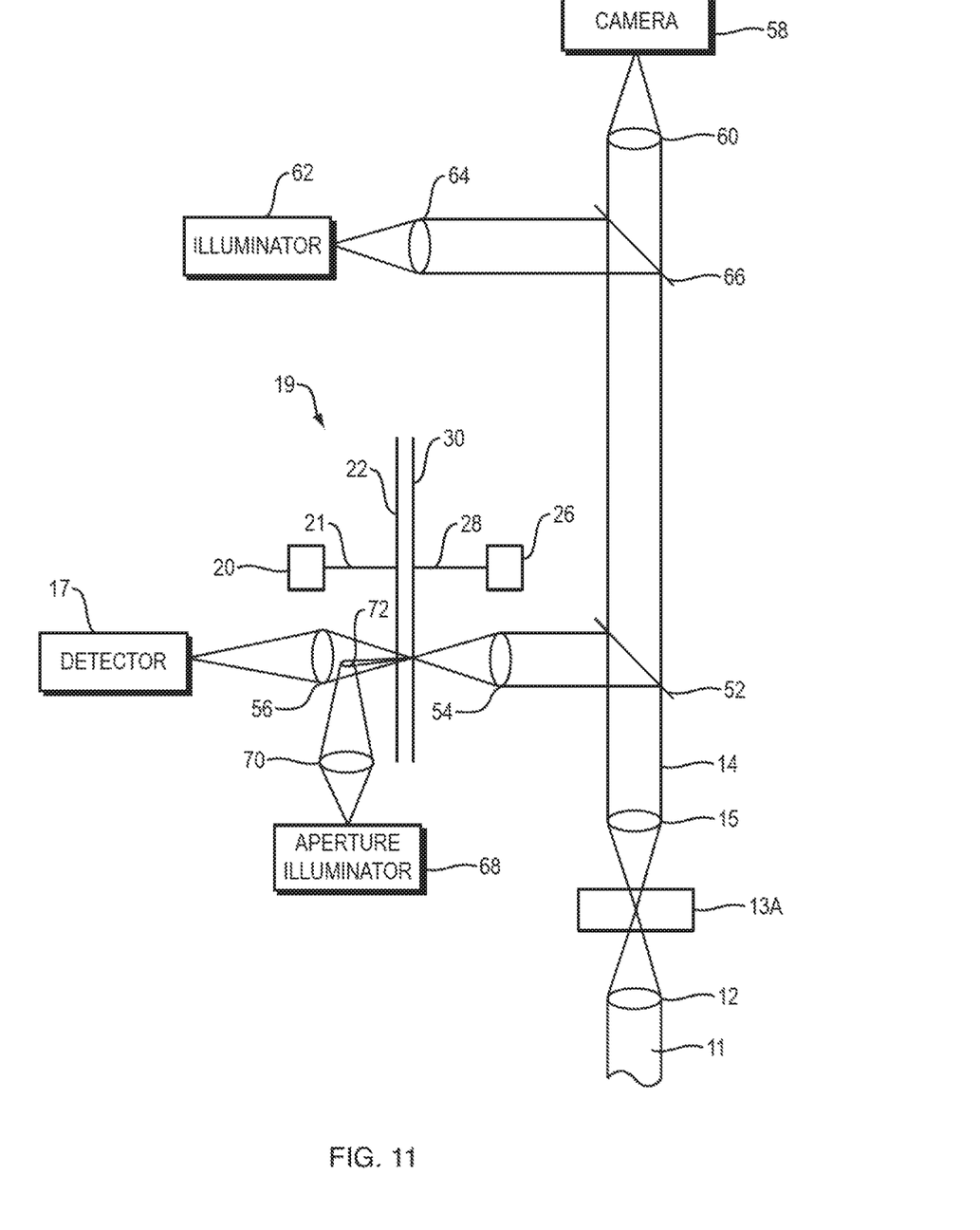
FIG. 11 is an alternative embodiment of the FTIR spectrometer device of FIG. 1.

Another embodiment of a FTIR spectrometer 2 is seen in FIG. 11, which shows how a user can optimize the shape and orientation, or alignment, of light beam aperture 38 with respect to sample 13. In this embodiment, IR signal 14 is reflected by an IR dichroic beam splitter 52 through a reflective focus lens 54 into aperture controlling assembly 19 and then through another reflective focus lens 56 and onward to IR detector 17.

A camera 58 and a focus lens 60 are positioned in line with IR signal 14 to allow the user to see a full view of the sample 13 in sample container 13A at all times. The user can advantageously employ camera 52 to optimize the size of the light beam aperture 38 provided by the aperture controlling assembly 19 as well as properly orient light beam aperture 38 with respect to sample 13.

Light from a white Köhler sample illuminator 62 travels through a focus lens 64 and is reflected by a 50/50 white light beam splitter 66 to illuminate sample 13 in sample container 13A. Light from an aperture illuminator 68 (e.g., a bright red aperture illuminator) can be transmitted through a focus lens 70, and then reflected off of a mirror 72 into and through aperture controlling assembly and onward to sample 13. The light from aperture illuminator 68 is used to superimpose an image of sample aperture 38 onto sample 13 so that the user can ensure that the size and orientation of sample aperture 38 matches the area of sample 13 to be analyzed. By having aperture illuminator 68 project a different color light (red) on the sample, it allows the user to more clearly distinguish the illuminated border of sample aperture 38.

The user then views the sample that is highlighted with the light from aperture illuminator 68, and the user then employs controller 18 to activate first and second motors 20, 26 and rotate first and second plates 22, 30 to mate the size and orientation of sample aperture 38 with the area of sample 13 to be analyzed.

Since the light from aperture illuminator 68 is near IR detector 17 it will naturally block some of the light going to IR detector 17. Thus, it is to be appreciated that once sample aperture 38 is properly sized and oriented, aperture illuminator 68 can be moved out of the light beam, allowing more light to reach IR detector 17 during data collection.

It is to be appreciated that reflective optics could be used in place of the transmission optics described in this embodiment. This can be advantageous in some embodiments since reflective optics and be used with longer wavelength IR light. Standard lenses have been used for illustration purposes to enhance clarity.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. An imaging device comprising:
   an IR source;
   a collimator positioned downstream of the IR source;
   an interferometer positioned downstream of the collimator;
   a sample compartment positioned downstream of the interferometer;
   a detector positioned downstream of the sample compartment; and
   an aperture controlling assembly positioned between the sample compartment and the detector and comprising:
      a first plate having a first plurality of substantially circular plate apertures extending therethrough;
      a second plate having a second plurality of substantially rectangular plate apertures extending therethrough, wherein the second plurality of substantially rectangular plate apertures include four groups of the substantially rectangularly shaped apertures, the substantially rectangular apertures of each group having about the same length but each group having a different width from the other groups;
      a first motor operably connected to the first plate; and
      a second motor operably connected to the second plate, the first and second motors configured to move the first plate and the second plate with respect to one another so as to align any one of the first plurality of substantially circular plate apertures with any one of the second plurality of substantially rectangular plate apertures to define a plurality of light beam apertures.

2. The imaging device of claim 1, wherein each of the first plate and the second plate has a circular shape.

3. The imaging device of claim 2, wherein the first plurality of substantially circular plate apertures is positioned along a circle proximate a peripheral edge of the first plate and the second plurality of substantially rectangular plate apertures is positioned along a circle proximate a peripheral edge of the second plate.

4. The imaging device of claim 1, wherein the second plate is circular and wherein a longitudinal axis of at least one of the plurality of substantially rectangular plate apertures of the second plate is at an angle with respect to a radius of the second plate that is non-zero and is different than that of another of the substantially rectangular plate apertures of the second plate.

5. The imaging device of claim 1, further comprising a third motor, a mechanical bearing, and a support system configured to rotate the aperture controlling assembly around a selected light beam aperture.

6. The imaging device of claim 1, further comprising:
   a first focus element positioned between the interferometer and the sample compartment;
   a second focus element positioned between the sample compartment and the aperture controlling assembly; and
   a third focus element positioned between the aperture controlling assembly and the detector.

7. The imaging device of claim 6, further comprising:
   a camera positioned in line with the IR source and the sample compartment.

8. The imaging device of claim 6, further comprising a controller connected to a monitor, the first motor, the second motor and the detector.

9. The imaging device of claim 6, further comprising a controller connected to the first motor, the second motor and the detector.

10. The imaging device of claim 1, wherein the first and second plate are one of (a) rotated with respect to one another by the first and second motor and (b) moved linearly with respect to one another by the first and second motor.

11. The imaging device of claim 1, wherein each group comprises 24 of the substantially rectangularly shaped apertures.

12. The imaging device of claim 1, wherein a plurality of the substantially rectangular apertures in each group are substantially parallel to each other, and each of the plurality of the substantially rectangular apertures in each group has a slightly different angular relationship relative to the circumference of the first plate.

13. The imaging device of claim 1, wherein each of the plurality of the substantially rectangular apertures in each group has a slightly different angular relationship relative to a field of view of the detector.

14. The imaging device of claim 1, wherein the slightly different angular relationship
   enables control of the shape of the light beam aperture in the field of view of the detector to plus or minus 3.25 degrees.

15. The imaging device of claim 1, wherein the substantially rectangularly shaped apertures in each group are positioned alternately substantially parallel and substantially rectangular to one another along a circular shape of the first plate.

* * * * *